Figure 1:
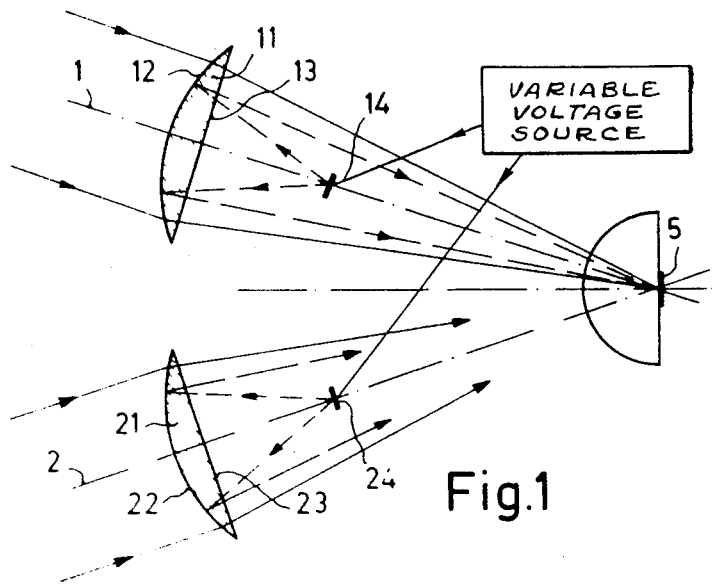

United States Patent
Desvignes et al.

[15] 3,638,019
[45] Jan. 25, 1972

[54] LIGHTING DEVICE COMPRISING TWO OPTICAL SYSTEMS AND A RADIATION SENSITIVE DETECTOR

[72] Inventors: Francois Desvignes, Bourg la Reine; Jean Jacques Hunzinger, Paris, both of France

[73] Assignee: U.S. Philips Corporation, New York, N.Y.

[22] Filed: Apr. 14, 1970

[21] Appl. No.: 28,324

[30] Foreign Application Priority Data

Apr. 4, 1969 France..................................6910560

[52] U.S. Cl..................250/83.3 H, 250/202, 250/203 R, 250/233, 350/201
[51] Int. Cl..................................................G01j 1/42
[58] Field of Search..............250/83.3 H, 203 R, 202, 233; 350/201

[56] References Cited

UNITED STATES PATENTS 3,162,764  12/1964  Haviland..................250/203 R X
3,105,905  10/1963  Loy..........................250/83.3 H

*Primary Examiner*—Walter Stolwein
*Assistant Examiner*—Morton J. Frome
*Attorney*—Frank R. Trifari

[57] ABSTRACT

A sighting device equipped with two optical systems which each comprise an optical modulator and a lens and the optical axes of which intersect at an acute angle and with a radiation-sensitive detector is described. It is shown that by inserting auxiliary radiation sources between the lenses of the optical systems and the radiation-sensitive detector and by using the lenses as catadioptric systems for imaging the auxiliary radiation sources asymmetrical errors can be eliminated.

9 Claims, 3 Drawing Figures

LIGHTING DEVICE COMPRISING TWO OPTICAL SYSTEMS AND A RADIATION SENSITIVE DETECTOR

The invention relates to a sighting device equipped with two optical systems which each consist of an optical modulator and a lens. The optical axes of the two optical systems intersect at and with a radiation-sensitive detector. Such a device may form part of a horizon sensor which is used to control and maintain the attitude of a space vehicle.

In the last 10 years the problem of controlling and maintaining the attitude of a space vehicle has been extensively studied and many solutions have been proposed, none of which, however, is entirely satisfactory.

Of the three movements performed by any passive free-body moving in space the rolling and the pitching can be controlled by a device including a horizon sensor. The third movement, the yawing, can only be corrected by means of an astronomic reference point (for example a star).

The horizon sensor is designed so that when a heavenly body or planet is sighted an image thereof is formed by means of an optical system on at least one detector sensitive to thermal or photoelectric radiation.

When the attitude of the space vehicle is correct, all the detectors receive exactly equal radiation intensities (which may be zero). At the slightest deviation the detectors receive different radiation intensities. The signals from the detectors are applied through a comparatively bulky electronic circuit to devices which cause the vehicle to assume the desired attitude by means of gas jets. In this process the rotation of a flywheel or any other device capable of changing the position of one of the axes of the vehicle may be used. For a satellite circling the earth the latter planet will be used as a reference point. Owing to the atmosphere and the variations in luminous intensity of the light from the surface of the earth, however, it is impossible to use the visible radiation and hence only the sufficiently constant infrared radiation can be utilized by the detection device.

Two types of detectors may be used:
1. Photoelectric detectors, in which each photon individually and entirely transfers its energy to an electron of the radiation-sensitive material. These detectors are rarely used, because their sensitivity is low and their detection threshold (the value of the wavelength above which no radiation is detected) is too high. In addition, if these detectors are to be used in the middle infrared range, they must be cooled to a low temperature.
2. Thermal detectors, in which the energy of the radiation received is converted into heat. Owing to their sensitivity, which is independent of the wavelength, they are to be preferred in the form of bolometers or thermopiles to the first-mentioned detectors. Bolometers have the advantage of fast response. Their greatest disadvantage is, however, that they show a certain thermal drift. In operation they require the application of a direct voltage, by which they are heated. This results in a drift which may become considerable and is superposed on the signal produced by the incident radiation. Consequently, weak radiation cannot be measured. The influence of this drift on the measurements has been eliminated by distinguishing between the signals produced by the incident radiation and the signals produced by the heating due to the application of the direct voltage; to this end the incident radiation is modulated. Thus, the modulated component of the output signal of the bolometer corresponds only to the signal produced by the incident radiation.

Two types of modulators are used: opticomechanical and electro-optical. When a high reliability is required, which is the case in long-life satellites, the use of mechanical systems is avoided as far as possible. Hence there is an increasing interest in electro-optical modulators based on the property of light absorption exhibited by the free electrons in a solid. These modulators basically consist of PN junctions of semiconductors to which alternating voltages are applied.

A horizon sensor comprises two sighting devices, one for the North-South direction and one for the East-West direction. Each sighting device includes two optical systems the axes of which meet at a given angle in the axis of a bolometer. The direction of the bisector of this angle relative to a fixed direction in space provides an indication of the orientation of the vehicle. The sighting device is proportioned so that when the direction of the bisector coincides with the direction of sighting the output signal of the bolometer is zero.

The two optical systems of a sighting device each comprise a lens and a modulator. The beams emerging from the optical systems converge on the same bolometer. The two modulators operate at the same frequency but with opposite phase. A deviation from the sighting direction, which shows itself as a displacement of the image of a planet or a star, supplies to the bolometer signals having the same frequency but different strengths and phases. The strength of the difference signal provides information about the magnitude of the deviation, and the phase of the difference signal provides information about the direction of the deviation.

As has been mentioned hereinbefore, it is the purpose of the modulation of the radiation to eliminate errors due to the thermal drift of the bolometer. However, there still remain errors due to optical asymmetries which arise from geometric factors but also from factors inherent in the materials used.

The semiconductor materials used in the manufacture of the lenses and modulators (for example, germanium for radiations having wavelengths in the middle of the infrared range) may have transmission coefficients which are slightly different from element to element, which results in the radiation being asymmetrically transmitted with consequent shifting of the zero point. A correction of the zero displacement may be effected in the electronic circuit associated with the detector, but for fundamental reasons this correction is preferably effected at the level at which the error is produced, i.e., in the infrared detection.

It is an object of the present invention to eliminate the errors due to asymmetrical transmission. For this purpose it is characterized in that there is inserted between the lenses of the optical systems and the radiation-sensitive detector at least one auxiliary radiation source, the lenses of the optical system forming catadioptric systems for imaging the auxiliary radiation source on the radiation-sensitive detector. The output signal of the radiation-sensitive detector due to the auxiliary radiation is equal to the interference signal caused by the apparent asymmetry. However, the two signals have opposite signs. The fact that the lenses of the optical systems can be used not only for their proper tasks but also for imaging the auxiliary radiation source provides a large advantage. The radiation energy of the auxiliary radiation source required to supply a given compensating illumination for the detector may be considerably smaller than in the known systems, with a consequent considerable decrease of the power consumption. Further, the aperture angle of the compensating beam coincides with the angle in which the interfering radiation is operative and approximates to that of the optical system itself, permitting a highly satisfactory compensation which is independent of local variations of the optical properties of the detector system.

Figure 2:
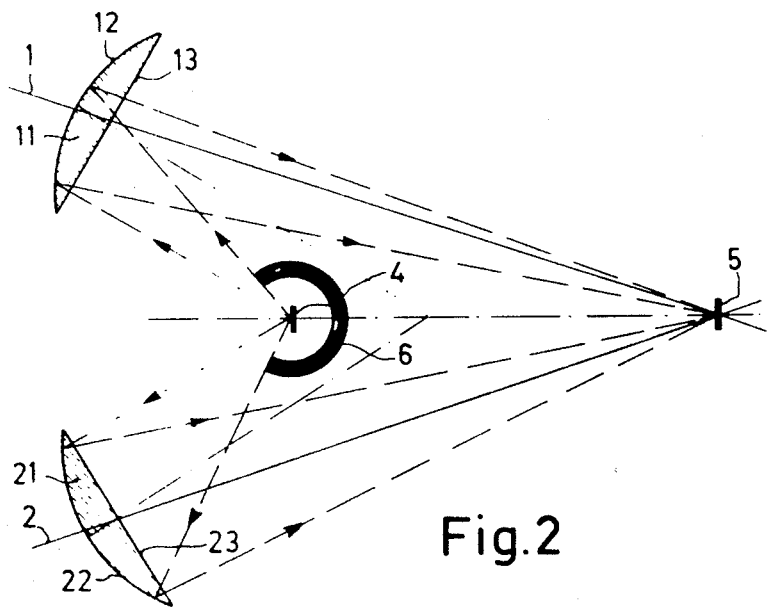
Figure 3:
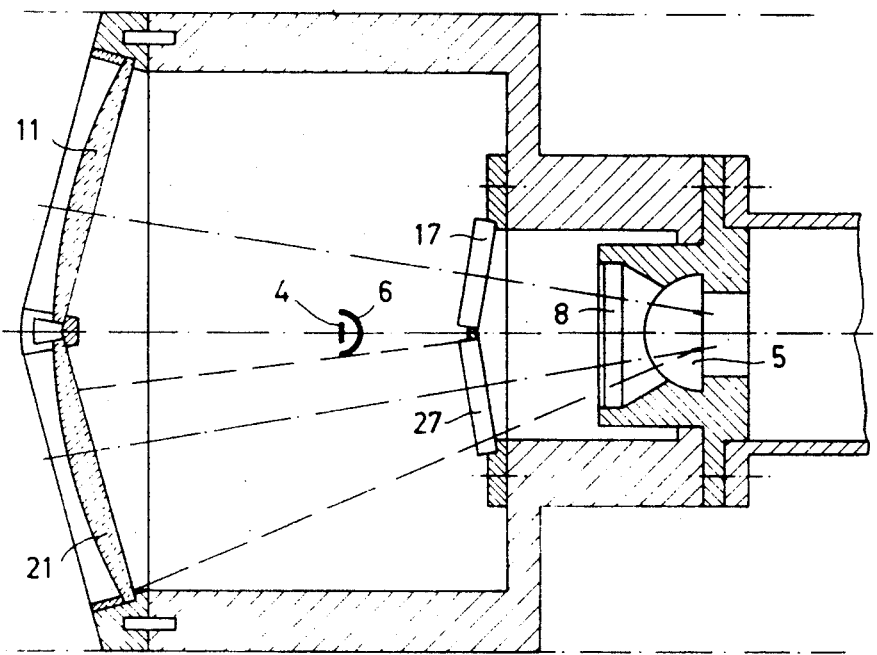

The invention will now be described more fully with reference to the accompanying drawings, in which FIGS. 1, 2 and 3 show, by way of example, embodiments of a device according to the invention.

FIG. 1 shows a sighting device including two optical radiation paths 1 and 2. In each radiation path there is inserted an objective 11 or 21 respectively which is made of germanium and transmits infrared radiation. The transmissivity of surfaces 12 and 22 of these lenses is not a maximum and hence these surfaces may serve as mirrors for compensation elements 14 and 24 respectively. Since the refractive index of germanium is about 4, the reflection coefficient of a not specially treated surface is comparatively high, i.e., about 36 percent. Together with the other elements of the optical system, especially the objective itself, this untreated surface constitutes a catadioptric system which forms a suitably magnified image of the compensation source on the radiation-sensitive element 5.

The compensation sources 14 and 24 each comprise a small metal surface through which a weak electric current flows, which gives rise to heating and hence to the emission of radiation.

In the embodiment shown in FIG. 1 such a heat source is inserted in each radiation path so as to be located in the optical axis of the respective sighting device. Each heat source is fed with an adjustable electric voltage in a manner such that a slight difference between the voltages supplied to the two sources, i.e., a temperature difference between them, can be used to compensate for asymmetry errors.

FIG. 1 shows the ray paths which corresponds to the two functions of each lens: the imaging of an object at infinity is shown in full lines and the imaging of the compensation source is shown in broken lines.

FIG. 2 shows a second embodiment of a device according to the invention. In this device a single source 4 is used to equalize the radiations following both paths 1 and 2 in the zero condition. To enable the rays which image the single source 4 on the radiation-sensitive detector 5 to be equally divided between the two paths, the optical centers of the two paths must coincide and lie on the line joining the source 4 to the detector 5. This is obtainable by tilting both objectives 11 and 21 in the manner shown in FIG. 2. In this case the electric supply has a fixed value. The effective luminous flux radiated along each path now is determined by a screen 6 by the displacement or rotation of which the effective luminous flux following each of the paths can be regulated.

FIG. 3 shows a practical embodiment of a horizon sensor using two optical systems. The two lenses are again designated 11 and 21, reference numeral 5 designates a bolometer and reference numerals 17 and 27 designate infrared modulators. A filter 8 enables a band having a selected value to be transmitted. The modulators 17 and 27 are fed in phase opposition, the intensity and the phase of the infrared signal received by the bolometer 5 indicating the value and the sign respectively of the deviation.

The bolometric element is disposed in the image focus of the lenses 11 and 21 and the image nodal points of these lenses are located so that the two images of the bolometer at infinity closely approach the horizon.

A horizon sensor comprises at least two sighting devices of the above-mentioned kind, one of these sighting devices indicating the deviation in the North-South direction and the other that in the East-West direction.

What is claimed is:

1. A device for sighting on a remote source of radiation, comprising a first lens, a modulator aligned with the first lens along an optic axis, a second lens, a second optical modulator aligned with the second lens along a second optical axis intersecting the first optical axis, a radiation-sensitive detector in the path of both optic axes, whereby the radiation from the remote source is imaged on the radiation-sensitive detector, and a local source of radiation between the lenses and the radiation detector for projecting radiation in the direction of the lenses, at least one internal surface of each lens having sufficient reflectivity to comprise a catadioptric system for imaging the auxiliary radiation source on the radiation-sensitive detector.

2. A device as claimed in claim 1, wherein an auxiliary radiation source is disposed in each optical axis passing through the optical center of a lens and the center of the radiation-sensitive detector.

3. A device as claimed in claim 2, wherein the radiation can be separately regulated for each source.

4. A device as claimed in claim 1, wherein one auxiliary radiation source is provided and that the point of intersection of the axes of the optical systems lies on a line which joins the auxiliary radiation source and the radiation-sensitive detector.

5. A device as claimed in claim 4, wherein the auxiliary radiation source is surrounded by an apertured screen for limiting the auxiliary radiation to the lenses.

6. A device as claimed in claim 5, wherein the screen is movable.

7. A device as claimed in claim 1, wherein the radiation source comprises a small metallic surface through which an electric current flows, the radiation emitted by the or each surface being directed to the lenses.

8. A device as claimed in claim 1, wherein the surfaces of the lenses turned to the auxiliary radiation sources are coated with antireflection layers.

9. A device as claimed in claim 8, wherein the lenses are made of a material having a high refractive index.

* * * * *